United States Patent

[11] 3,608,856

[72] Inventor George G. T. Hurley
 922 B West Monterosa, Phoenix, Ariz. 85013
[21] Appl. No. 848,905
[22] Filed Aug. 11, 1969
[45] Patented Sept. 28, 1971

[54] MIRROR MOUNTING BRACKET
 1 Claim, 5 Drawing Figs.
[52] U.S. Cl. ....................................... 248/480,
 248/226, 248/230, 248/288, 287/3
[51] Int. Cl. ....................................... A47g 1/24,
 G02b 5/08
[50] Field of Search......................................... 248/230,
 231, 360, 475, 479, 480, 488, 283, 284, 285, 286,
 288; 287/3, 14; 350/307

[56] References Cited
UNITED STATES PATENTS
1,579,907 4/1926 Zink .............................. 248/488 X
2,706,023 4/1955 Merritt ......................... 248/231 X
FOREIGN PATENTS
646,265 11/1950 Great Britain................ 248/480

Primary Examiner—William H. Schultz
Attorney—Willard L. Groene

ABSTRACT: A mirror mounting bracket, particularly for a rear view mirror of a vehicle, in which the rotation of the mirror held on the bracket serves to operate the clamp to secure the mirror in mounting position of the motor vehicle.

PATENTED SEP 28 1971 3,608,856

INVENTOR.
GEORGE G.T. HURLEY
BY
Willard S. Greene
ATTORNEY

MIRROR MOUNTING BRACKET

BACKGROUND OF THE INVENTION

This invention pertains to mirror support brackets, and is particularly directed to brackets for mirrors, such as rear view mirrors used on automobiles and other vehicles.

Heretofore, it has been difficult to secure rear view mirrors on existing brackets, such s west-coast-type-mirror supports, without the use of screwdrivers, wrenches and other special tools. Further, the mirror when mounted could not be readily adjusted from the driver's seat for accurate positioning the mirror for proper view.

SUMMARY OF THE INVENTION

One of the object of this invention is to provide a mirror support bracket in which the mirror may be manipulated to clamp, unclamp and position the mirror for proper view on the motor vehicle body.

Still another object is to provide a simple and rugged clamping bracket for a rear view mirror including a main clamping worm of the clamp directly mounted to the mirror so that the rotation of the mirror rotates the clamping worm for tightening the clamp and positioning the mirror.

DESCRIPTION OF THE PREFERRED EMBODIMENT

Figure 1:
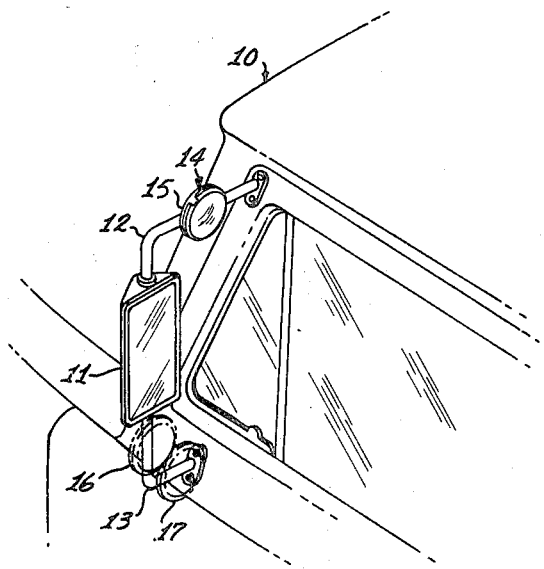
FIG. 1 is a general perspective view showing the mounting of a mirror bracket incorporating the features of this invention on a motor vehicle.
Figure 2:
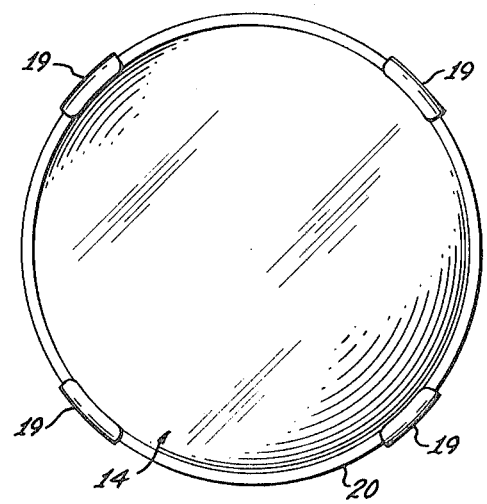
FIG. 2 is a front elevation of the mirror support bracket shown in FIG. 1.
Figure 3:
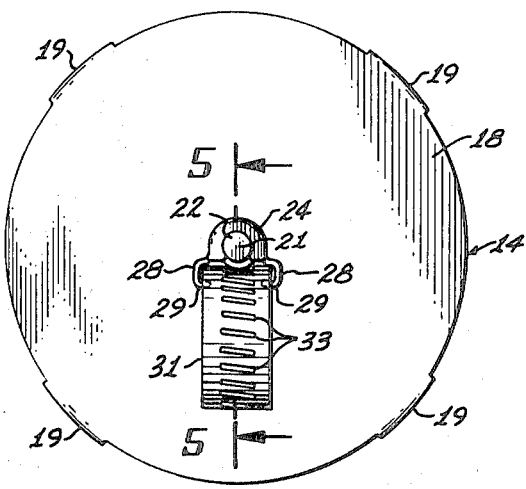
FIG. 3 is a rear elevation of the mounting bracket of FIG. 2.
Figure 4:
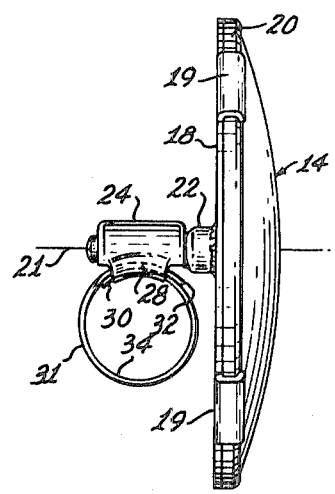
FIG. 4 is a side elevation of the mounting bracket shown in FIGS. 2 and 3.

As an example of one embodiment of this invention, there is shown a motor vehicle 10 having a west-coast-type mirror 11 mounted on the usual upper and lower L-shaped mirror support arms 12 and 13, the mirror 11 being the usual vertically elongated flat mirror of such devices.

In the instant application, a convex mirror 14 is to be mounted at desired selected locations such as at 15, 16 or 17 on the L-shaped supports 12 and 13. To this end the concave mirror 14 is provided with a backing plate 18 having a series of circumferentially spaced clips 19 which are turned over to rigidly grip the edge 20 of the mirror 14 so as to hold it securely to the backing plate 18.

Figure 5:
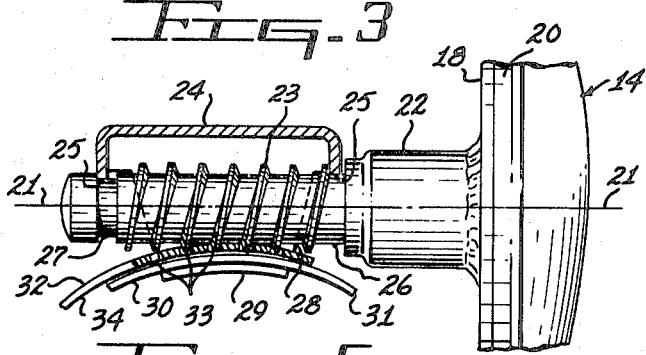
FIG. 5 is an enlarged fragmentary view on the line 5—5 of FIG. 3.

FIxed to the backing plate 18 on the axis 21 of the mirror 14 is the support stud 22 having a worm thread 23 formed on its outer end. A guide housing 24 surrounds the worn threads 23 and is journaled against axial movement by suitable bearing surfaces 25 on the bearing diameters 26 and 27 on the stud 22. Clip portions 28 are formed integral with the sides of the housing 24 and have turned in ends 29 to which one end 30 of the mounting strap 31 is rigidly fixed. The other end 32 of the mounting strap 31 is provided with a series of angularly disposed lateral slots 33 spaced along the other end 32 of the mounting strap 31 so arranged as to be operatively engaged by the worm threads 23 when the other end 32 is inserted between the one end 30 and the shank 22 as best shown in FIG. 5. By this arrangement manual rotation of the mirror 14 about the axis 21 causes retraction of expansion of the bore 34 of the mounting strap for gripping the unit described to the mirror supports 12 and 13 and for adjusting the concave mirror 14 from the driver's seat as required. In effect in the structure recited the mirror functions as a handwheel to operate the clamping, unclamping and position of focus of the mirror 14 by single hand manipulation with no tools required.

I claim:

1. A mirror mounting bracket comprising:
   A. a mirror,
   B. a backing plate for supporting the mirror to the backing plate,
   C. a support stud fixed to the back surface of the backing plate on the axis of the mirror,
   D. a worm thread formed on the outer end of the support stud,
   E. a guide housing surrounding the worm threads journaled against axial movement on the support stud,
   F. clip portions formed integral with the sides of the housing,
   G. turned in ends on the clip portions,
   H. a mounting strap having one end fixed to the turned in ends,
   I. and the other end having a series of slots spaced therealong engaged by the worm threads when the other end is inserted between the one end of the strap and the shank.